United States Patent Office 3,491,047
Patented Jan. 20, 1970

3,491,047
BITUMEN - MALEIC ANHYDRIDE - ETHYLENE-VINYL ACETATE REACTION PRODUCTS AND MOLDING COMPOSITIONS MADE THEREFROM
Bruce W. Hotten, Orinda, Calif., assignor to Chevron Research Company, San Francisco, Calif., a corporation of Delaware
No Drawing. Filed Mar. 27, 1967, Ser. No. 625,982
Int. Cl. C08f 37/16
U.S. Cl. 260—28.5       9 Claims

ABSTRACT OF THE DISCLOSURE

Plastic compositions comprising a maleated bitumen reacted with a polymer which contains hydroxy alkylene, ester-substituted alkylene and alkylene monomer units, the compositions optionally containing an aromatic plasticizer oil.

BACKGROUND OF THE INVENTION

This invention relates to bituminous base plastics compositions. More particularly, it relates to thermoplastic materials produced from various bitumens and being suitable for production of various molded objects and the like.

Recent years have seen increasing use of plastics materials, such as polymers of various sorts, in the manufacture of articles previously made of other materials. Thus, these plastics have been substituted in instances for wood, metals, glass, etc., and in numerous applications have been extremely successful since they brought desirable characteristics, such as flexibility, resilience, and ability to be molded into various forms. However, relatively high cost of most of the popular polymers has made them unsuitable for many purposes. Thus, there is a great need for plastics materials that can be made from inexpensive, naturally derived materials and still retain the strength, flexibility, and resistance to heat that is typical of the various previously employed polymers. Such materials could thus be used in various bulk applications where the high cost of the conventional plastics makes their use prohibitively expensive. Typical examples of articles in which low costs are important include cove moldings; drain, waste and vent pipes; battery cases; binders for hard board; extruded gasket materials; coatings and carpet backings; laminated foams for roofing; surfaces for various running tracks; etc.

Attempts at employing various bituminous materials for such uses have been generally unproductive. Ordinary asphalts do not have the strength characteristics necessary for these applications, and their low softening points usually make their use inadvisable for most applications. Harder bituminous materials, such as naturally derived gilsonite and solvent extracts from petroleum processes, are too hard and brittle, and also lack the strength characteristics that are desirable.

SUMMARY OF THE INVENTION

It has now been found that a high strength, high elasticity thermoplastic material may be produced by the process of
(A) Reacting a bitumen, at a temperature of from about 100°–200° C., with from about 5 to 30% by weight of maleic anhydride, followed by (B) Reacting, at a temperature sufficiently high such that softening of the reactants permits their intimate contact, the product of (A) with a polymer of randomly distributed monomer units characterized by the formulae:

(X) 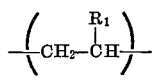

(Y) 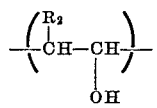

(Z) 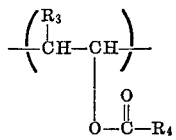

wherein $R_1$, $R_2$ and $R_3$ are hydrogen or alkyl radicals of one to two carbon atoms, $R_4$ is hydrogen or an alkyl radical of one to eleven carbon atoms, (X) is present in the polymer in the amount of 80 to 95 mol percent, (Y) in the amount of 0.1 to 5 mol percent and (Z) in the amount of 5 to 20 mol percent.

The polymers which are reacted with the product of (A) to form the compositions of this invention are derived from an olefin, an olefinic alcohol, and an ester of an olefinic alcohol with a monocarboxylic acid. Suitable olefins which make up units (X) in the polymers include ethylene, propylene, butylene, and isobutylene. Suitable olefinic alcohols from which unit (Y) is derived include vinyl alcohol, allyl alcohol, 2-butenol, 1-butenol, etc. The unit represented by (Z) is derived from an ester of the olefinic alcohols listed above and a monocarboxylic acid of from 1 to 12 carbon atoms. Thus, suitable acids include formic, acetic, propionic, butanoic, hexanoic, octanoic, lauric, etc. Unsaturated acids such as propenoic, butenoic, hexenoic, octenoic, etc. may also be used.

The polymers may be prepared by any suitable method. Ordinarily, free-radical polymerization is utilized with a free-radical producing catalyst, such as oxygen or an organic peroxide, at high pressures and temperatures of from about 150° to 250° C. However, a more simple method of producing the polymers comprises reacting an olefin and an ester of an unsaturated alcohol under free-radical conditions, at a pressure from about 100 to 200 atmospheres at a temperature in the order of 150° to 250° C., distilling to remove unreacted materials, and hydrolyzing a portion of the ester groups. From five to fifty percent of the ester groups are hydrolyzed. The preferred polymers have molecular weights in the general range of from about 100,000 up to about 1,000,000.

A preferred method of hydrolyzing the ester groups is by saponification with a strong base, such as NaOH, KOH, LiOH, etc. The saponification can be accomplished by mixing the base in proper proportions with the polymer. It is common to employ an inert solvent, such as a light hydrocarbon, in the saponification step. The solvent may then be removed by distillation.

An example of a preferred polymer is one which is prepared by the saponification of a copolymer of ethylene and vinyl acetate. These copolymers are well known in the art and are prepared by reacting an ester of vinyl alcohol and acetic acid with ethylene at a pressure of about 15,000 to about 30,000 p.s.i.g. at a temperature above about 150° C., and separating the resulting copolymer from the unreacted monomer. The copolymer is then saponified with a proper amount of the base.

The bitumens which are used in preparing the compositions of this invention include a wide variety of materials. They are encompassed within the definition established by the American Society for Testing Materials (ASTM D8–55) as follows: "Mixtures of hydrocarbons of natural or pyrogenous origin, or combinations of both, frequently accompanied by their non-metallic derivatives, which may be gaseous, liquid, semisolid, or solid, and which are completely soluble in carbon disulfide." Thus, the suitable materials include the natural bitumens and the artificial or oil asphalts. The natural bitumens or natural asphalts include all of those asphaltic materials which are found in naturally occurring deposits. The preferred materials of this class are the asphalt types, which contain essentially no inorganic impurities and include gilsonite, gramite, glants pitch, etc. Another class of bitumens which may be employed are the artificial asphalts which have been previously mentioned. These include the oil or petroleum asphalts which are derived from vacuum and/or steam distillation of crude oils and the blown or oxidized asphalt which may be formed from semi-asphaltic materials by airblowing soft or liquid petroleum residues. Another important class of artificial asphalts includes the cracked asphalts, which are formed as by-products in oil cracking processes. For the purposes of the present invention, a preferred class of bitumens consists of those which are defined as solvent-extracted asphalts and are the by-products or raffinates from various solvent extraction processes used in manufacture of lubricating oils and special products. The solvents employed are usually light hydrocarbons such as propane, butane, and pentane. The solvent-extracted asphalts are usually quite hard and brittle and contain a large asphaltene content.

The maleation of the bitumen is effected by simply mixing a proper proportion of maleic anhydride with the bituminous material and heating it at a temperature of about 125° to 250° C., preferably from about 150° to 225° C., for a period of from about one-half to two hours. It is propitious to employ a reflux reactor during the reaction period, since the boiling point of maleic anhydride is approximately 204° C. At the end of the reaction period, unreacted maleic anhydride is stripped from the mixture.

The reaction of the maleated bitumen with the hydroxyl-containing polymer is accomplished under conditions wherein contact between the reactants is assured. Thus, it is preferable to heat the mixture to such a temperature that the bitumen and polymer are softened sufficiently that mixing will allow the reaction to proceed. No specific temperatures are required. The temperature thus depends upon the viscosity and softening point of the bitumen and polymer, respectively.

As previously mentioned, it has been found to be possible to react up to about 30% by weight of maleic anhydride with various bitumens. The exact mechanism of this reaction is not perfectly understood. However, it is known that there is not sufficient non-aromatic unsaturation present in the bitumens to account for the quantity of maleic anhydride reacted as being an allylic condensation. A preferred amount of maleic anhydride embraces a range of from about 10 to 30% by weight in relation to the weight of the bitumen. More preferably, 15 to 25% is used.

In a preferred embodiment of the invention a plasticizer oil is incorporated into the plastics composition. The preferred oils are those having an aromatic ring content of from about 15 to 75% by weight. More preferably, the aromatic ring content should be from about 30 to 60% by weight.

Examples of the preferred plasticizer oils include a wide variety of lubricating oils such as naphthenic base, paraffin base and mixed base oils having the aromatic content required. A preferred class is the aromatic extract oils. Another suitable class includes synthetic alkylarenes, a preferred example being alkyl benzene bottom oil, benzene alkylated with a polyolefin such as polypropylene and having an average side chain length of about $C_{20}$. The alkyl carbons may be on one or more side chains. The preferred oils have an analine point below about 150° F.

The plasticizer oil may be introduced into the composition at completion of the reaction of the maleated bitumen with the polymer (step B in column 2) or more preferably it is employed as a solvent for the polymer in the hydrolysis step previously mentioned.

When the plasticizer oil is employed, it may be added in amounts up to about 45% by weight relative to the crosslinked maleated material (product of step B). A preferred amount is from about 30 to 45% by weight added.

DESCRIPTION OF THE INVENTION

The following examples illustrating the preparation of the compositions of this invention are intended to be only illustrative and not limiting.

EXAMPLE 1

Saponification of ethylene-vinyl acetate copolymer in aromatic oil plasticizer

A mixture of 40% by weight of a copolymer of ethylene and vinyl acetate (the copolymer contained 7.8 ethylene units per vinyl acetate unit and had a molecular weight of about 600,000) and 59% by weight of an aromatic extract oil was placed in a reaction vessel equipped with a thermometer, heating unit, and mechanical stirrer. The mixture was heated and stirred until the copolymer was dispersed in the oil (about 300° F.), then cooled to about 210° F. A portion of NaOH having a weight equal to 1% of the total mixture was added in water to the solution, and the mixture was then heated to about 330–340° F. and stirred for one hour. The mixture was then allowed to cool, yielding a flexible elastomer having a percent elongation of 1400.

EXAMPLE 2

Saponification of ethylene-vinyl acetate copolymer in removable solvent

The procedure of Example 1 was followed except that in place of the oil diluent an aromatic petroleum thinner was employed. After the saponification the thinner was stripped from the polymer under vacuum.

EXAMPLE 3

Maleation of Boscan asphalt

A 240 g. portion of Boscan asphalt having an ASTM penetration of 123 was charged to a resin flask equipped with a stirrer, a thermometer, a condenser with drying tube, and a nitrogen inlet. The material was heated with stirring to 110° C. while purging with nitrogen to drop off moisture. The material was then cooled to 98° C. and 60 g. (20% by weight of total) of maleic anhydride was added. The mixture was heated to 106° C. and infrared analysis was obtained. The mixture was then heated to 200° C. and reaction was allowed to continue for a period of 3 hours. The reflux rate of the maleic anhydride decreased substantially over the period. The mixture was then allowed to cool to a temperature of 150–180° C., vacuum was applied, and excess maleic anhydride was removed over a period of 1.1 hours. The flask was then allowed to cool and the reacted product was removed. The net weight of the product was 282 g. The recovered product was much stiffer than the original asphalt.

EXAMPLE 4

Plastics compositions from Boscan asphalt

50% by weight of the product of Example 3 and 50% by weight of the product of Example 1 were mixed together by milling through a 3-roll mill at a temperature of from 300 to 350° F. The product was a tough, firm but flexible plastics material which became soft and rubbery in the temperature range of 200–400° F. but did not flow below 400° F. The material had a Durometer hardness of 42, an Instron tensile strength of 380 p.s.i.g. and percent elongation of 910.

EXAMPLE 5

Maleation of solvent deasphalter bottoms

The general procedure of Example 3 was followed employing, rather than the Boscan asphalt, a material entitled "Solvent Deasphalter bottoms," which is a residue from a propane-butane extract process involved in crude oil treatment. This material is relatively hard and brittle, having about a 50% asphaltene and 50% maltene content. The maleation was performed at 10, 15, 20 and 30% maleic anhydride concentrations. As noted, the procedure followed that of Example 1; however, when 30% of maleic anhydride was used, a violent exothermic reaction which overflowed the flask took place. The reaction required only 0.2 hour at a temperature range of 120–180° C.

EXAMPLE 6

Formation of plastics compositions from saponified copolymer and maleated solvent deasphalter bottoms Plastics compositions were formed following the procedure of Example 5 employing 50-gram portions of the maleated product of Example 5. The portions were each milled in a 3-roll mill at a temperature of 180–190° F. with 50-gram portions of the product of Example 1. The physical characteristics of these materials may be found in the table which follows the examples.

EXAMPLE 7

Plastics compositions from maleated gilsonite

The procedures of Examples 1, 3 and 4 were followed, employing as the bitumen instead of the Boscan asphalt of Example 3, gilsonite, maleating the gilsonite with 20% by weight of maleic anhydride, and milling with an equal quantity of the saponified copolymer in oil described in Example 1. The gilsonite employed was Lo-Vis Selects marketed by the American Gilsonite Company. This material was a black solid having a specific gravity of 1.03 and a ring and ball softening point of 280° F. The product obtained was a tough, flexible, leathery material having an Instron tensile strength of 601.7 p.s.i.g. and a percent elongation of 38.7%.

The following table gives characteristics of the prepared compositions. The saponified copolymer was the same in each example.

From the above data it may be seen that the compositions of this invention are plastics materials having good strength characteristics, flexibility and heat resistance, and a large portion of the composition is a relatively inexpensive material. In evaluating the strength characteristics of the compositions, it may be noted taht the unreacted bitumens are either too weak to give reliable strength tests or they are too brittle to have any appreciable flexibility.

In addition to the major components, it will be realized that other helpful additives may be employed in the compositions. For example, oxidation inhibitors, coloring agents, fillers, etc. may be employed in the compositions.

In addition to the uses of the materials previously enumerated, including molding of various plastics articles, another suitable use for the compositions lies in the area of inexpensive binders for various applications. For example, light particulate matter such as vermiculite may be mixed with the compositions and formed into sheets which, when covered with appropriate surfacing materials such as paper, foil, etc., function as substitutes for various construction paneling such as plasterboard and plywood. Sheets so formed are light, have very high insulating values and are relatively inexpensive. They compare favorably with plywood in resistance to fire and are much lighter than plasterboard.

What I claim is:

1. A plastics composition comprising the product obtained by the process of (A) reacting a bitumen at a temperature of from 100° to 200° C. with from about 5 to 30% by weight of maleic anhydride followed by (B) reacting at a temperature sufficiently high that softening of the reactants permits their intimate contact, the product of (A) with a polymer of randomly distributed monomer units characterized by the formulae:

(X) 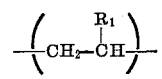

(Y) 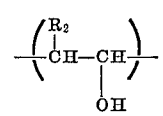

and (Z) 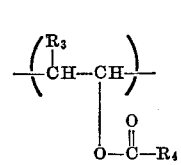

wherein $R_1$, $R_2$ and $R_3$ are hydrogen or alkyl radicals of one to two carbon atoms, $R_4$ is hydrogen or an alkyl radical of one to eleven carbon atoms, (X) is present in the polymer in the amount of 80 to 95 mol percent, (Y) in the amount of 0.1 to 5 mol percent and (Z) in the amount of 5 to 20 mol percent.

| | Composition of Maleated Bitumen | | | Characteristics of Plastic Products | | | | |
|---|---|---|---|---|---|---|---|---|
| Bitumen | Wt. percent Maleic Anhydride in Reaction Mixture | Reaction Temp., °C. | Reaction Time, hrs. | Tensile Strength Instron, p.s.i.g. | Percent Elongation | Softening Temp. Heizbank, °F. | Softening Temp. Ring & Ball, °F. | Hardness, Durometer Shore A-2 (ASTM D676) |
| Solvent deasphalter bottoms | 10 | 190–200 | 1.5 | 310 | 670 | 250 | 210 | 59 |
| Do | 15 | 130–200 | 1.0 | 530 | 690 | (¹) | >310 | 64 |
| Do | 20 | 130–200 | 1.0 | 620 | 910 | (¹) | >310 | 67 |
| Do | 30 | 120–180 | 0.2 | 520 | 400 | (¹) | >310 | 69 |
| Do | 10 | 190–200 | 1.5 | 625 | 1,130 | (¹) | >310 | |
| Do | 15 | 130–200 | 1.0 | 660 | 870 | (¹) | >310 | |
| Boscan asphalt | 20 | 100–200 | 3.7 | 380 | 910 | ² 400 | | 42 |
| Gilsonite ³ | 20 | 80–130 | 1.0 | 602 | 39 | | | |

¹ Rubbery above 400.
² Rubbery, 200–400.
³ Diluted with 30% tetralin for stirrability during reaction.

2. The composition of claim 1 which contains in addition up to 45% by weight relative to the product of (B) of an aromatic oil plasticizer.

3. The composition of claim 2 wherein the plasticizer oil contains from about 30 to 60% by weight of aromatic rings.

4. The composition of claim 3 wherein the plasticizer oil is added as a solvent for an olefin-unsaturated alcohol carboxylic acid ester copolymer which is saponified to produce the polymer used in step (B).

5. The composition of claim 1 in which the bitumen is a solvent-extraction raffinate.

6. The composition of claim 1 in which $R_1$, $R_2$ and $R_3$ are hydrogen and $R_4$ is methyl.

7. The composition of claim 6 wherein 15 to 30% by weight of maleic anhydride is employed in (A).

8. The composition of claim 5 wherein the solvent-extraction raffinate is a propane-butane mixture extraction raffinate.

9. The composition of claim 1 wherein the ratio of (A) to the polymer in step (B) is from 1:4 to 1:1.

References Cited

UNITED STATES PATENTS

| | | |
|---|---|---|
| 2,796,413 | 6/1957 | Baer. |
| 2,993,880 | 7/1961 | Aldridge et al. |
| 3,005,800 | 10/1961 | Powers. |
| 3,061,538 | 10/1962 | Corbett _____ 208—44 |
| 3,336,252 | 8/1967 | Raichle et al. |

MORRIS LIEBMAN, Primary Examiner

S. L. FOX, Assistant Examiner

U.S. Cl. X.R.

106—273; 208—44; 260—33.6